(12) United States Patent
Umezawa

(10) Patent No.: US 9,927,823 B2
(45) Date of Patent: Mar. 27, 2018

(54) POWER SUPPLY CONTROL CIRCUIT AND IMAGE FORMING APPARATUS

(71) Applicant: KYOCERA Document Solutions Inc., Osaka (JP)

(72) Inventor: Hideo Umezawa, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/263,627

(22) Filed: Sep. 13, 2016

(65) Prior Publication Data
US 2017/0075369 A1   Mar. 16, 2017

(30) Foreign Application Priority Data
Sep. 15, 2015 (JP) .................. 2015-181938

(51) Int. Cl.
| G05F 1/70 | (2006.01) |
| G05F 1/46 | (2006.01) |
| G05F 1/577 | (2006.01) |
| G03G 15/00 | (2006.01) |
| H02J 1/00 | (2006.01) |

(52) U.S. Cl.
CPC ............. G05F 1/462 (2013.01); G03G 15/80 (2013.01); G05F 1/577 (2013.01); H02J 1/00 (2013.01)

(58) Field of Classification Search
CPC . G05F 1/462; G05F 1/577; H02J 1/00; G03G 15/80
See application file for complete search history.

(56) References Cited

U.S. PATENT DOCUMENTS

| 7,321,976 B2* | 1/2008 | Hasegawa | ................. G06F 1/26 713/300 |
| 2002/0188792 A1* | 12/2002 | Stryker | ............... G06F 13/4022 710/305 |
| 2003/0085621 A1* | 5/2003 | Potega | .................. B60L 11/185 307/18 |

FOREIGN PATENT DOCUMENTS

JP    2007-171899 A    7/2007

* cited by examiner

Primary Examiner — Ryan Walsh
(74) Attorney, Agent, or Firm — IP Business Solutions, LLC

(57) ABSTRACT

A power supply control circuit includes a plurality of ports, and a plurality of power supply units that each turn on and off the power supply from the power source to the load connected to the port. The power supply control circuit also includes an identification information acquisition unit, a sequence information storage unit, and a switch control unit. The identification information acquisition unit acquires identification information from the loads connected to the respective ports. The sequence information storage unit stores therein power-up sequence information and power-down sequence information specified for each of the loads. The switch control unit causes the power supply unit to turn on and off the power supply to the load corresponding to the identification information, according to the power-up sequence information and the power-down sequence information specified for the load.

5 Claims, 6 Drawing Sheets

POWER SUPPLY CONTROL CIRCUIT AND IMAGE FORMING APPARATUS

INCORPORATION BY REFERENCE

This application claims priority to Japanese Patent Application No. 2015-181938 filed on Sep. 15, 2015, the entire contents of which are incorporated by reference herein.

BACKGROUND

The present disclosure relates to a power supply control circuit and an image forming apparatus, and more particularly to a technique to control power supply to a load.

Some of multi-functional image forming apparatuses, such as so-called multifunction peripherals, include a plurality of ports (connectors) for retrofitting optional apparatuses such as a post-processing apparatus and a paper cassette. The optional apparatuses connected to the respective ports of the image forming apparatus are different from each other in load capacity connected to the power source. Accordingly, in a power supply control sequence for turning on and off the power through a circuit for supplying power to the ports, a power-up sequence adapted for the optional apparatus having a largest load capacity is adopted for turning on the power, in order to prevent an inrush current to thereby suppress a malfunction originating from an excessive current. For turning off the power, a power-down sequence adapted for the optional apparatus that requires a longest time when turning off the power is adopted, because the optional apparatuses connected to the ports may include one that requires a certain time when turning off the power, for example for saving the latest status. In this respect, techniques to modify the power supply to the connected load according to the power consumption of the load have been known.

SUMMARY

The disclosure proposes further improvement of the foregoing technique.

In an aspect, the disclosure provides a power supply control circuit that controls power supply when supplying power from a power source to a plurality of loads. The power supply control circuit includes a plurality of ports, a plurality of power supply units, an identification information acquisition unit, a sequence information storage unit, and a switch control unit.

The ports are provided for respectively connecting the plurality of loads.

The power supply units respectively turn on and off the power supply from the power source to the plurality of loads respectively connected to the plurality of ports.

The identification information acquisition unit acquires identification information proper to each of the loads, from the loads connected to the respective ports.

The sequence information storage unit stores therein power-up sequence information and power-down sequence information specified with respect to each of the plurality of loads.

The switch control unit reads out, from the sequence information storage unit, the power-up sequence information and the power-down sequence information with respect to the load corresponding to the identification information acquired by the identification information acquisition unit, and causes the power supply unit to turn on and off the power supply to the load corresponding to the identification information, according to the power-up sequence information and the power-down sequence information read out.

In another aspect, the disclosure provides an image forming apparatus to which an optional apparatus can be retrofitted, and including the power supply control circuit.

The power supply control circuit controls power supply to the optional apparatus retrofitted, regarding the optional apparatus as the load.

DETAILED DESCRIPTION

Figure 1:
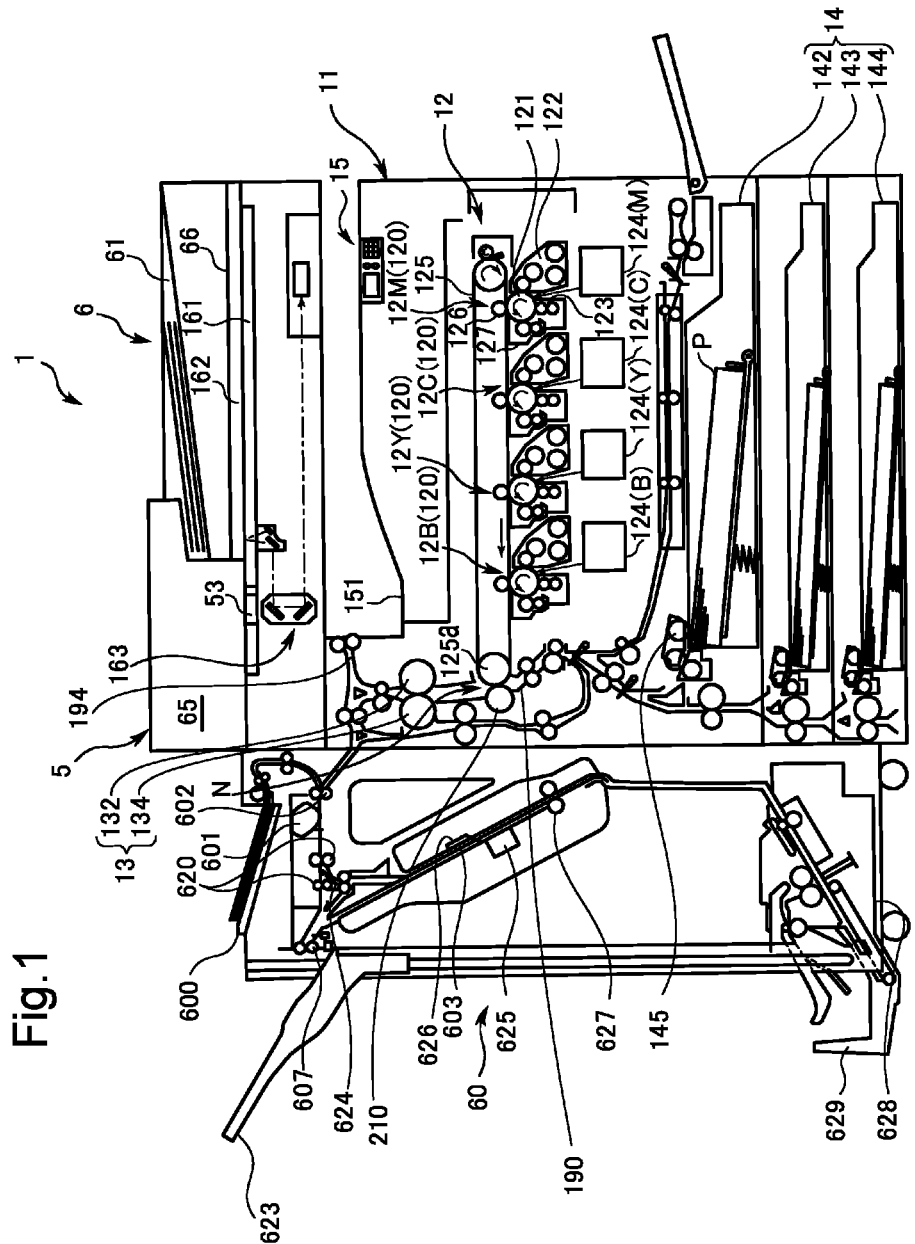
FIG. 1 is a schematic cross-sectional view showing a configuration of an image forming apparatus according to an embodiment of the disclosure.

Hereafter, a power supply control circuit and an image forming apparatus according to an embodiment of the disclosure will be described with reference to the drawings. FIG. 1 is a schematic cross-sectional view showing a configuration of the image forming apparatus according to the embodiment of the disclosure.

The image forming apparatus 1 is a multifunction peripheral having the functions of, for example, copying, printing, scanning, and facsimile transmission. The image forming apparatus 1 includes a main body 11, in which an image forming unit 12, a fixing unit 13, a paper feed unit 14, a paper discharge unit 15, a document feeding unit 6, and a document reading unit 5 are provided. In this embodiment, the image forming apparatus 1 also includes a paper discharge apparatus (post-processing apparatus) 60.

The document reading unit 5 includes a platen glass 161 mounted on the upper face of the main body 11, an openable document holding cover 162 for holding a source document placed on the platen glass 161, and a reading mechanism 163 that reads the image of the document placed on the platen glass 161. The reading mechanism 163 includes for example a charge coupled device (CCD) to optically read the image of the document, and generates image data.

The document feeding unit 6 includes a document table 61 on which source documents are placed, a document discharge area 66 to which the document that has been read is discharged, and a document transport mechanism 65. The document transport mechanism 65 includes a paper feed roller, a transport roller, and a paper reversing mechanism, which are not shown. The document transport mechanism 65 picks up the documents placed on the document table 61 one by one by driving the paper feed roller and the transport roller, and transports the document to a position opposing a document reading slit 53 to allow the reading mechanism 163 to read the document through the document reading slit 53. Thereafter, the document transport mechanism 65 discharges the document to the document discharge area 66.

The image forming unit 12, the fixing unit 13 and the paper feed unit 14 are enclosed inside the main body 11. The paper feed unit 14 includes paper cassettes 142, 143, and 144 removably inserted in the main body 11. A sheet stack P composed of stacked sheet-shaped recording medium (hereinafter, simply sheet) is placed in each of the paper cassettes 142, 143, and 144.

The image forming unit 12 performs an image forming operation including forming a toner image on the sheet delivered from the paper feed unit 14. The image forming unit 12 includes a magenta image forming subunit 12M that uses a magenta toner, a cyan image forming subunit 12C that uses a cyan toner, a yellow image forming subunit 12Y that uses a yellow toner, and a black image forming subunit 12B that uses a black toner, sequentially aligned from the upstream side toward the downstream side along the running direction of an intermediate transfer belt 125. Hereinafter, the image forming subunits may be collectively referred to as image forming subunits 120, when it is unnecessary to distinguish the colors. The image forming unit 12 also includes the intermediate transfer belt 125 spanned over a plurality of rollers including a drive roller 125a (secondary transfer opposing roller), so as to endlessly run in a sub scanning direction in the image forming operation, and a secondary transfer roller 210 abutted against the outer circumferential surface of the intermediate transfer belt 125, at a position where the intermediate transfer belt 125 is engaged with the drive roller 125a.

The image forming subunits 120 each include a photoconductor drum 121, a developing device 122 that supplies the toner to the photoconductor drum 121, a non-illustrated toner cartridge in which the toner is stored, a charging device 123, an exposure device 124, a primary transfer roller 126, and a drum cleaning device 127.

The primary transfer roller 126 is located at a position opposing the corresponding photoconductor drum 121 via the intermediate transfer belt 125. A transfer bias is applied to the primary transfer roller 126 by a non-illustrated transfer bias application mechanism, so that the primary transfer roller 126 can transfer the toner image formed on the outer circumferential surface of the photoconductor drum 121, onto the surface of the intermediate transfer belt 125.

A transfer bias is applied to the secondary transfer roller 210 by the transfer bias application mechanism. The secondary transfer roller 210 transfers the color toner image formed on the surface of the intermediate transfer belt 125 onto the sheet transported from the paper feed unit 14. The secondary transfer roller 210 forms a nip region N, where the toner image is secondarily transferred to the sheet, in collaboration with the drive roller 125a, via the intermediate transfer belt 125. The sheet transported along the sheet transfer route 190 is caught with pressure between the intermediate transfer belt 125 and the secondary transfer roller 210 at the nip region N, so that the toner image on the intermediate transfer belt 125 is secondarily transferred to the sheet.

The fixing unit 13 applies heat from a heating roller 132 to the toner image transferred onto the sheet by the image forming unit 12 to thereby fix the image, while the sheet is passing a fixing nip region between the heating roller 132 and a pressure roller 134. The sheet, now having the color image formed and fixed thereon, is discharged to an output tray 151 provided in the main body 11, through a paper discharge transport route 194 extending from the upper end of the fixing unit 13.

The paper feed unit 14 includes the paper cassettes 142, 143, and 144 removably inserted in the main body 11 at a position lower than the exposure device 124. In each of the paper cassettes 142, 143, and 144 the sheet stack composed of a plurality of sheets is placed. A pickup roller 145 is provided above the paper cassette 142, to pick up an uppermost sheet of the sheet stack placed in one of the paper cassettes 142, 143, and 144, and forward the sheet to the sheet transfer route 190.

The image forming apparatus 1 further includes a post-processing apparatus 60 that acts as a paper discharge apparatus. The post-processing apparatus 60 includes a sheet tray 600, a punching device 601, a transport roller 602, a sheet receiving table 603, a transport roller 620, a discharge roller pair 607, a sheet output tray 623, and a transport branch guide 624. The post-processing apparatus 60 also includes a stapling device 625, a stopper 626, transport roller 627, a book binder 628, and an output tray 629.

In the image forming apparatus 1, the document feeding unit 6, the paper cassettes 142, 143, and 144, and the paper discharge apparatus (post-processing apparatus) 60 are optional apparatuses retrofitted to the image forming apparatus 1. The image forming apparatus 1 includes a plurality of ports (connectors) for connecting the respective optional apparatuses, so that the optional apparatuses can be electrically connected to the main body 11 of the image forming apparatus 1, via the respective ports. Each of the optional apparatuses connected as above is controlled by a controller to be subsequently described.

Figure 2:
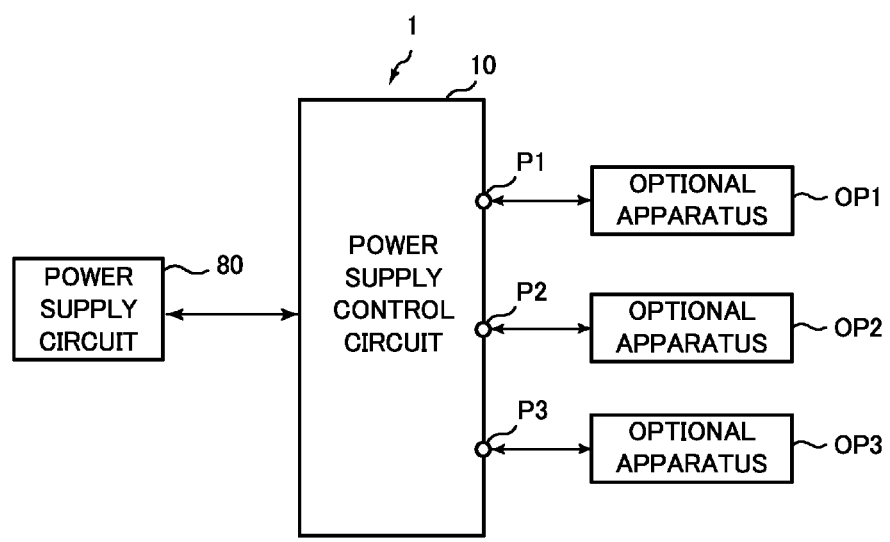
FIG. 2 is a schematic block diagram showing a power supply control system in the image forming apparatus.

Hereunder, power supply to the optional apparatuses of the image forming apparatus 1 will be described. FIG. 2 is a schematic block diagram showing a power supply control system in the image forming apparatus 1.

The image forming apparatus 1 includes a power supply circuit 80 and a power supply control circuit 10. The power supply circuit 80 generates DC power from AC power of the commercial power source (one example of a power source), and supplies the DC power to the functional units of the image forming apparatus 1.

The optional apparatuses OP1, OP2 and OP3 connected to the image forming apparatus 1 each receive power from the power supply circuit 80 through the power supply control circuit 10. The power supply control circuit 10 includes a plurality of ports (connectors) P1, P2, and P3, for electrically connecting the respective optional apparatuses OP1 to OP3 to the power supply control circuit 10. The power supply control circuit 10 controls the power supply, when supplying the power from the power supply circuit 80 to the optional apparatuses OP1 to OP3. In other words, the power supply control circuit 10 receives the power supply from the commercial power source through the power supply circuit 80. Here, each of the optional apparatuses OP1 to OP3 may be connected to any of the ports P1 to P3.

Figure 3:
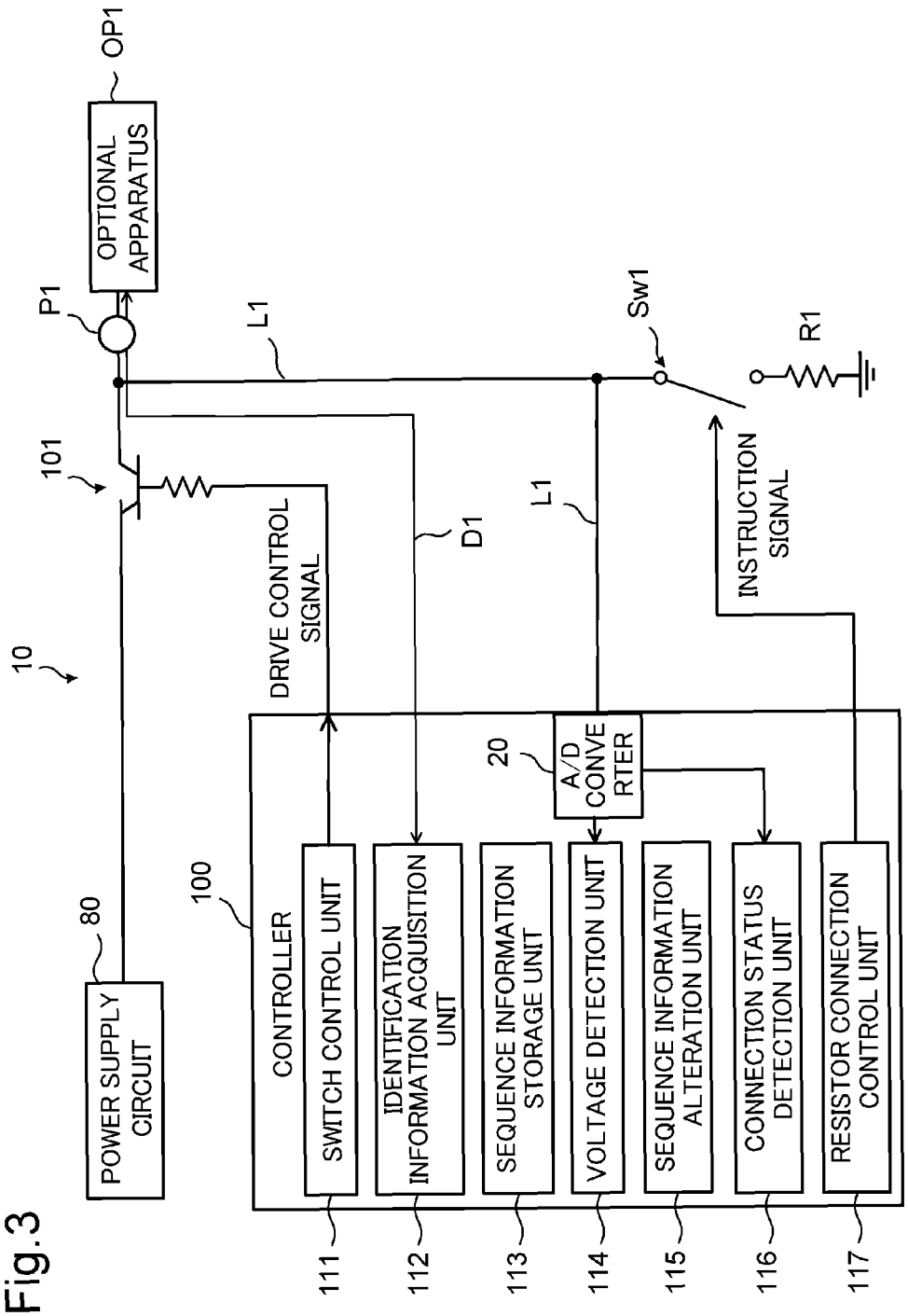
FIG. 3 is a schematic diagram showing an internal configuration of a power supply control circuit.

FIG. 3 is a schematic diagram showing an internal configuration of the power supply control circuit 10. FIG. 3 represents connection details of one (P1) of the ports P1 to P3 provided in the power supply control circuit 10. The remaining ports P2, P3 are also configured in the same way as the port P1.

The power supply control circuit 10 includes a controller 100, a FET circuit 101, the port P1, a pulldown resistor R1, and a switch Sw1. Though not shown in FIG. 3, actually the power supply control circuit 10 includes a plurality of sets of the FET circuit 101, the pulldown resistor R1, and the switch Sw1, to be utilized for the respective ports provided in the power supply control circuit 10.

The FET circuit (power supply unit) 101 is connected between the power supply circuit 80 and the optional apparatus OP1. The FET circuit 101 acts as a switch for controlling the electrical connection between the power supply circuit 80 and the optional apparatus OP1. The FET circuit 101 switches the electrical connection (power on or power off) between the power supply circuit 80 and the optional apparatus OP1, according to a drive control signal outputted from the controller 100 and inputted in the FET circuit 101 as a gate voltage.

A signal line D1, through which the digital signal outputted from the optional apparatus connected to the port P1 is inputted to the controller 100, is connected to the port P1. The signal line D1 is routed between the port P1 and the controller 100.

Further, a connection line L1, for detecting a voltage supplied from the power supply circuit 80 to the optional apparatus connected to the port P1, is connected to the controller 100. The connection line L1 further extends as far as an A/D converter 20 provided in the controller 100. The A/D converter 20 converts the analog voltage received through the connection line L1 into a digital value, and outputs the digital value to a voltage detection unit 114.

The pulldown resistor R1 is connected to the connection line L1 via the switch Sw1. The other end of the pulldown resistor R1, opposite to the end connected to the switch Sw1, is grounded. The switch Sw1 switches on and off the power between the connection line L1 and the pulldown resistor R1, according to an instruction signal from a resistor connection control unit 117 in the controller 100.

The controller 100 includes a central processing unit (CPU), a RAM, a ROM, and an exclusive hardware circuit.

The controller 100 includes a switch control unit 111, an identification information acquisition unit 112, a sequence information storage unit 113, a voltage detection unit 114, a sequence information alteration unit 115, a connection status detection unit 116, and the resistor connection control unit 117. As already described, the controller 100 also includes the A/D converter 20.

The controller 100 can act as the switch control unit 111, the identification information acquisition unit 112, the sequence information storage unit 113, the voltage detection unit 114, the sequence information alteration unit 115, the connection status detection unit 116, and the resistor connection control unit 117, for example upon operating according to a power supply control program stored in a non-illustrated HDD.

Alternatively, the controller 100 may include hardware circuits configured to act as the switch control unit 111, the identification information acquisition unit 112, the sequence information storage unit 113, the voltage detection unit 114, the sequence information alteration unit 115, the connection status detection unit 116, and the resistor connection control unit 117.

The following operations of the switch control unit 111, the identification information acquisition unit 112, the sequence information storage unit 113, the voltage detection unit 114, the sequence information alteration unit 115, the connection status detection unit 116, and the resistor connection control unit 117 are performed with respect to the ports P1 to P3, out of which the operation with respect to the port P1 will be described hereunder.

The switch control unit 111 outputs a drive control signal to the FET circuit 101, to switch on and off the power supplied from the power supply circuit 80 to the optional apparatus connected to the port P1 (the same applies to the ports P2, P3). The drive control signal has, for example, a rectangular waveform including a High-level signal and a Low-level signal. The FET circuit 101 electrically connects (switches on) between the power supply circuit 80 and the optional apparatus OP1 upon receipt of a High-level signal from the switch control unit 111, and electrically disconnects (switches off) between the power supply circuit 80 and the optional apparatus OP1 upon receipt of a Low-level signal.

The switch control unit 111 alters the duty ratio between the High level and the Low level (e.g., ratio between the times during which the signal is at the High level and Low level, in a period) of the drive control signal, to thereby control the time during which the FET circuit 101 is switched on. Here, the drive control signal stays at the High level after the optional apparatus is activated, and stays at the Low level after the optional apparatus is turned off.

The identification information acquisition unit 112 acquires, from the optional apparatus connected to the port P1, the identification information proper to the optional apparatus, through the signal line D1. The optional apparatuses OP1 to OP3 each store the identification information proper thereto, for example in a built-in memory.

The sequence information storage unit 113 stores therein power-up sequence information and power-down sequence information specified for each of the optional apparatuses OP1 to OP3. The power-up sequence information represents a mode of the voltage rise during a period from start of the power supply from the power supply circuit 80 to the optional apparatus until the voltage reaches a driving voltage appropriate for the optional apparatus (i.e., voltage rise rate during the period until reaching the driving voltage), according to the load capacity of the optional apparatus. The power-down sequence information represents a mode of reducing the voltage during a period from disconnection of the power supply from the power supply circuit 80 to the optional apparatus until the voltage drops to 0 V (i.e., voltage drop rate during the period until reaching 0 V).

The mode of the voltage rise varies depending on the duty ratio between the High level and the Low level of the drive control signal. More specifically, the higher the ratio of the High level is in the drive control signal, for the longer time the FET circuit 101 is switched on per unit time. Accordingly, the voltage rises more quickly when the power is supplied, the higher the ratio of the High level is in the drive control signal. Therefore, the power-up sequence information is defined, for example, by the voltage rise period from the start of the power supply from the power supply circuit 80 to the optional apparatus connected to the port P1 until the voltage of the supplied power is stabilized at the driving voltage, and the duty ratio between the High level and the Low level in the period represented by the voltage rise period.

Regarding the voltage drop, the lower the ratio of the High level is in the drive control signal, for the longer time the FET circuit 101 is switched off per unit time. Accordingly, the voltage drops more quickly while the power is supplied, the lower the ratio of the High level is. Therefore, the power-up sequence information is defined by the voltage drop period from the start of the disconnection of power supply from the power supply circuit 80 to the optional apparatus until the voltage of the supplied power drops to 0 V, and the duty ratio between the High level and the Low level in the period represented by the voltage drop period.

The switch control unit 111 reads out, from the sequence information storage unit 113, the power-up sequence information and the power-down sequence information specified for the optional apparatus identified by the identification information acquired by the identification information acquisition unit 112, and switches on and off the FET circuit 101 according to the power-up sequence information and the power-down sequence information thus read out, thereby controlling the power supply and power disconnection from the power supply circuit 80 to the optional apparatus identified by the identification information. In the case where the voltage fails to reach the driving voltage within the voltage rise period, the switch control unit 111 extends the voltage rise period, and supplies the power until the driving voltage is reached. In the case where the voltage fails to reach 0 V within the voltage drop period, the switch control unit 111 extends the voltage drop period, and supplies the power until the voltage drops to 0 V.

The voltage detection unit 114 detects the voltage being supplied to the optional apparatus connected to the port P1 from the power supply circuit 80 through the FET circuit 101, on the basis of the voltage inputted through the connection line L1 and acquired through the A/D converter 20.

In the case where the voltage change during the power-up period for the optional apparatus, detected by the voltage detection unit 114, is different from a voltage change stored in the sequence information alteration unit 115 in association with the power-up sequence information corresponding to the optional apparatus, the sequence information alteration unit 115 alters the power-up sequence information so as to bring the voltage change (mode of the voltage rise) of the optional apparatus detected by the voltage detection unit 114 closer to the voltage change stored in association with the power-up sequence information.

Likewise, in the case where the voltage change during the power-down period for the optional apparatus, detected by the voltage detection unit 114, is different from a voltage change stored in the sequence information alteration unit 115 in association with the power-down sequence information corresponding to the optional apparatus, the sequence information alteration unit 115 alters the power-down sequence information so as to bring the voltage change (mode of the voltage drop) of the optional apparatus detected by the voltage detection unit 114 closer to the voltage change stored in association with the power-down sequence information.

The connection status detection unit 116 detects whether the optional apparatus is connected to the port P1. The connection status detection unit 116 decides, for example on the basis of a voltage inputted from the A/D converter 20 when power is supplied to the optional apparatus connected to the port P1, from the power supply circuit 80 through the FET circuit 101 according to a drive control signal having a predetermined duty ratio between the High level and the Low level, that the optional apparatus is connected to the port P1 when the voltage from the A/D converter 20 is not lower than the driving voltage of the corresponding optional apparatus.

The resistor connection control unit 117 turns the switch Sw1 on and off according to an instruction signal, thereby connecting and disconnecting the pulldown resistor R1 to and from the connection line L1. The resistor connection control unit 117 connects the pulldown resistor R1 to the port with respect to which the connection status detection unit 116 has detected that the optional apparatus is not connected, after causing the FET circuit 101 to switch off.

Figure 4:
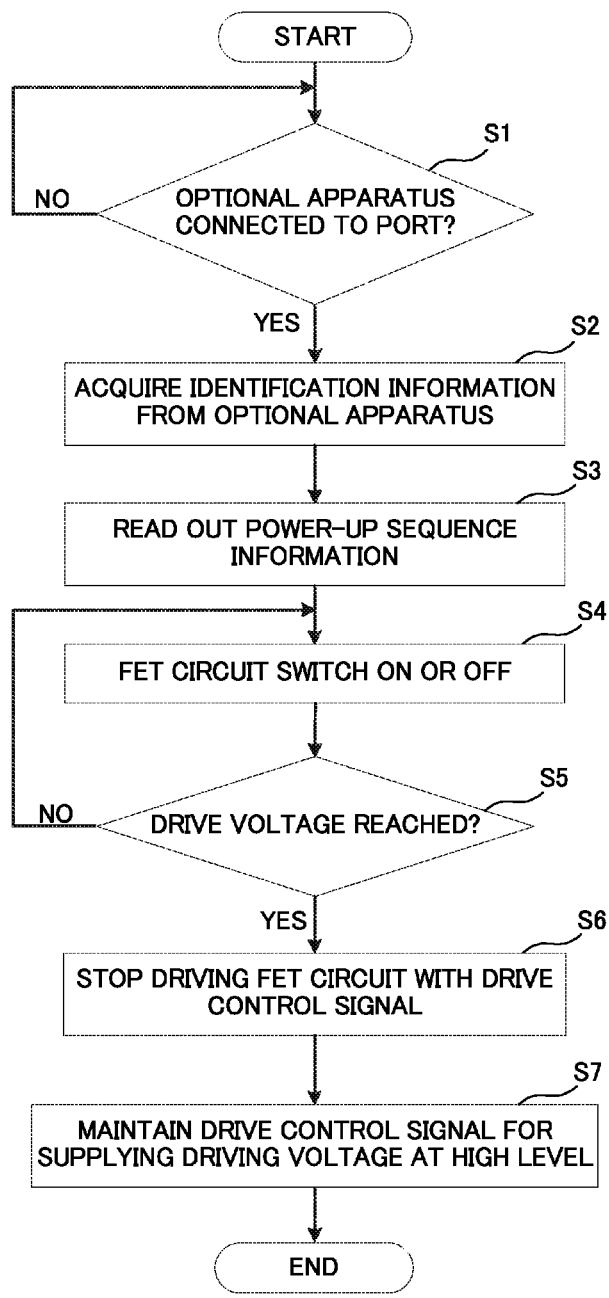
FIG. 4 is a flowchart showing a control process performed by the power supply control circuit when starting power supply to an optional apparatus.

A power supply control for the optional apparatus performed by the power supply control circuit 10 will be described hereunder. FIG. 4 is a flowchart showing a control process performed by the power supply control circuit 10 when starting the power supply to the optional apparatus.

First, the connection status detection unit 116 detects whether the optional apparatuses are respectively connected to the ports P1 to P3 (S1), at the time of starting the power supply to the optional apparatuses connected to the ports P1 to P3 from the power supply circuit 80 to turn on the optional apparatus according to the power-on instruction inputted by an operator. Here, the resistor connection control unit 117 stores the on/off status of the switch Sw1 (connection/disconnection of pulldown resistor R1) with respect to each port, and turns off the switch Sw1 of the port with respect to which it is decided that the pulldown resistor R1 is connected to the connection line L1 at the time that the operator has inputted the power-on instruction, to thereby disconnect the pulldown resistor R1 from the connection line L1.

When the connection status detection unit 116 detects that the optional apparatus is connected to any of the ports P1 to P3 (YES at S1), the identification information acquisition unit 112 acquires from each of the connected optional apparatuses the identification information proper thereto (S2). When the connection status detection unit 116 detects that the optional apparatus is not connected to any of the ports P1 to P3 (NO at S1), no further operation is performed.

Then the switch control unit 111 reads out, from the sequence information storage unit 113, the power-up sequence information corresponding to each of the optional apparatuses identified by the identification information acquired by the identification information acquisition unit 112 (S3). The switch control unit 111 generates a drive control signal representing a duty ratio between the High level and the Low level that accords with the power-up sequence information read out as above, with respect to each of the optional apparatuses, and outputs the generated drive control signal to the FET circuit 101 connected to the corresponding optional apparatus, thereby switching on and off the FET circuit 101 (S4). With the mentioned arrangement, upon starting the power supply from the power supply circuit 80 to each of the optional apparatuses identified by the identification information, the voltage to each optional apparatus is raised at a voltage rise rate that accords with the load capacity of the optional apparatus.

The switch control unit 111 stops driving the FET circuit 101 at the drive control signal that accords with the power-up sequence information (S6) when the voltage of each of the optional apparatuses respectively connected to the ports P1 to P3 detected by the voltage detection unit 114 reaches the driving voltage (YES at S5), and maintains the drive control signal at the High level so as to supply the driving voltage (S7).

As described above, in this embodiment the voltage to each of the optional apparatuses is raised according to the power-up sequence individually specified for each optional apparatus, upon starting the power supply to the optional apparatuses respectively connected to the ports P1 to P3. Therefore, the power-up sequence appropriate for each of the optional apparatuses connected to the ports P1 to P3 can be executed, according to the performance level of each optional apparatus.

Figure 5:
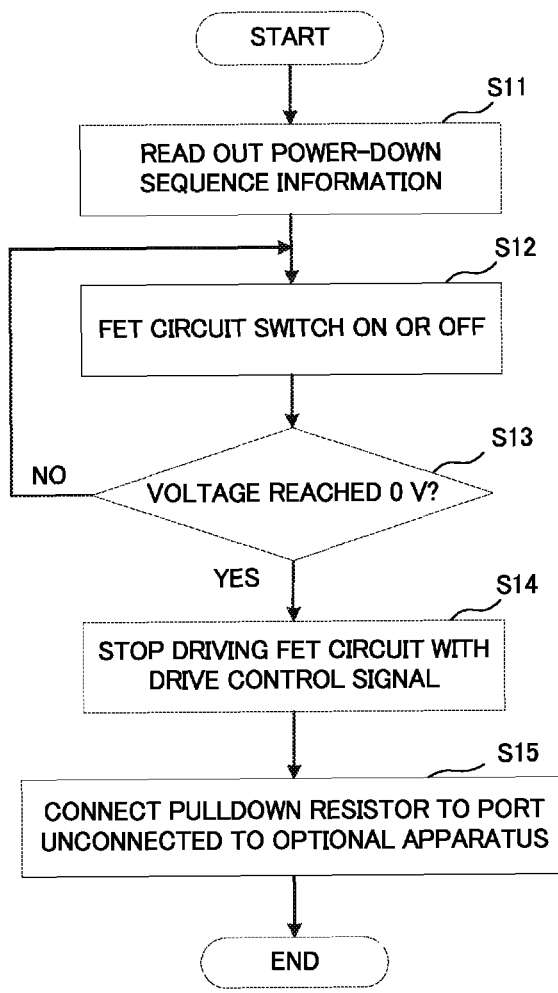
FIG. 5 is a flowchart showing a control process performed by the power supply control circuit when cutting off the power supply to the optional apparatus.

FIG. 5 is a flowchart showing a control process performed by the power supply control circuit 10 when cutting off the power supply to the optional apparatus.

When disconnecting the power supply from the power supply circuit 80 to the optional apparatuses connected to the ports P1 to P3, the switch control unit 111 reads out the power-down sequence information corresponding to each optional apparatus from the sequence information storage unit 113, using the identification information of the optional apparatus with respect to which the connection to the ports P1 to P3 is detected by the connection status detection unit 116 (S11).

The switch control unit 111 generates a drive control signal representing a duty ratio between the High level and the Low level that accords with the power-down sequence information read out as above with respect to each of the optional apparatuses, and outputs the generated drive control signal to the FET circuit 101 connected the corresponding optional apparatus, thereby switching on and off the FET circuit 101 (S12). With the mentioned arrangement, the voltage to each optional apparatus is gradually lowered at a voltage drop rate that accords with the load capacity of the optional apparatus, when disconnecting the power supply from the power supply circuit 80 to each of the optional apparatuses.

The switch control unit 111 stops driving the FET circuit 101 at the drive control signal that accords with the power-down sequence information (S14) when the voltage of each of the optional apparatuses detected by the voltage detection unit 114 drops to 0 V (YES at S13).

Therefore, the power-up sequence appropriate for each of the optional apparatuses connected to the ports P1 to P3 can be executed according to the performance level of each optional apparatus, by controlling as above the voltage drop at the time of disconnecting the power supply to the optional apparatuses, according to the power-down sequence individually specified for each optional apparatus.

In addition, after the process of S14, in other words when the power supply to the optional apparatus is turned off, the resistor connection control unit 117 turns on the switch Sw1 of the port with respect to which the connection status detection unit 116 has detected that the optional apparatus is not connected, to thereby connect the pulldown resistor R1 to the connection line L1 (S15). At this point, the operation is finished.

When the optional apparatus is not connected to the port as above and, for example, when the power supply control circuit 10 includes a capacitor connected to the connection line L1 to control the optional apparatus connected to the port, residual charge accumulated in the capacitor can be removed by connecting the pulldown resistor R1 to the connection line L1. Therefore, malfunction of the image forming apparatus 1 and the optional apparatus can be prevented when a service person carries out a maintenance work of the image forming apparatus 1 and the optional apparatus.

In the this embodiment, the resistor connection control unit 117 turns off the switch Sw1 of the port the connection line L1 of which is connected to the pulldown resistor R1, thereby disconnecting the pulldown resistor R1 from the connection line L1 upon receipt of the power-on instruction inputted by the operator, and turns on the switch Sw1 of the port to which the optional apparatus is not connected thereby connecting pulldown resistor R1 to the connection line L1, at the time of disconnecting the power supply to the optional apparatus (S15). Alternatively, the connection status detection unit 116 may perform the operations of S2 and the subsequent steps only with respect to the port to which the optional apparatus is connected, at the time of starting the power supply to the optional apparatus, and may turn on the switch Sw1 of the port to which the optional apparatus is not connected thereby connecting the pulldown resistor R1 to the connection line L1, instead of performing the operations of S2 and the subsequent steps. In this case, with respect to the port to which the optional apparatus is connected, the pulldown resistor R1 may be restricted from being connected to the connection line L1, as a default setting. For the port the connection line L1 of which is connected to the pulldown resistor R1, the resistor connection control unit 117 may turn off the switch Sw1 of such a port thereby disconnecting the pulldown resistor R1 from the connection line L1, upon detecting that the optional apparatus is connected to the port.

Figure 6:
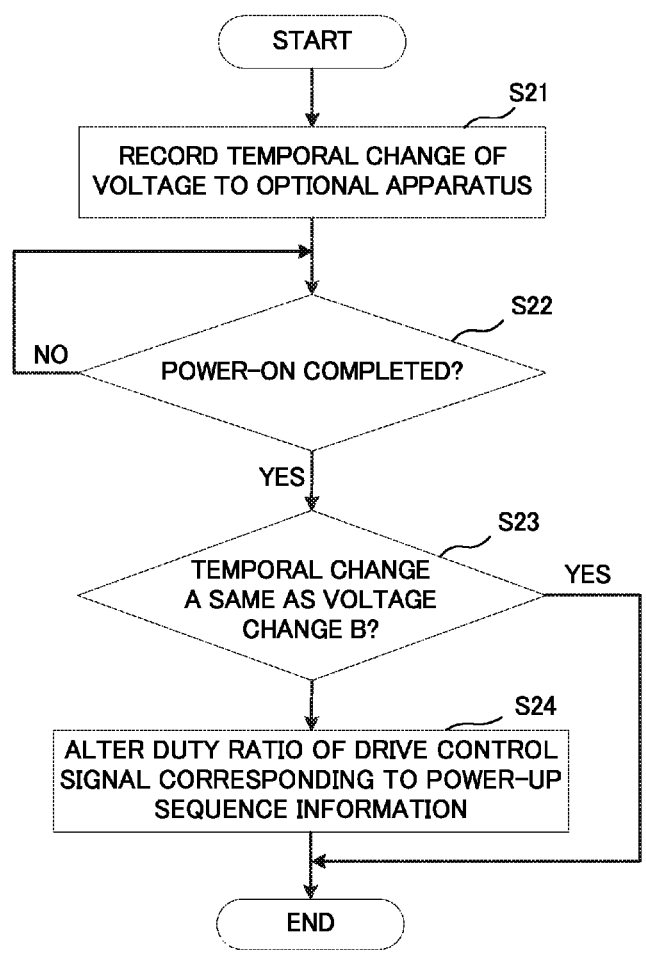
FIG. 6 is a flowchart showing a control process to modify power supply sequence information specified with respect to each optional apparatus.

Hereunder, an operation for altering the power supply sequence information specified with respect to each optional apparatus will be described. FIG. 6 is a flowchart showing a control process to modify the power supply sequence information specified with respect to each optional apparatus.

In addition to the foregoing power supply control for the optional apparatus, the power supply control circuit 10 is configured to alter the power supply sequence information specified with respect to each optional apparatus, which will be described referring to FIG. 6.

During the control operation for starting the power supply to the optional apparatus, the sequence information alteration unit 115 records the temporal change of the voltage of each optional apparatus detected by the voltage detection unit 114 (S21).

After the control operation for starting the power supply to the optional apparatus is finished and also the power-up for each optional apparatus is completed (S22), the sequence information alteration unit 115 decides whether a temporal change A representing the change of the voltage of the optional apparatus detected and recorded as above is the same as a voltage change B stored in association with the power-up sequence information specified in advance for the optional apparatus (S23). This decision is made with respect to each of the optional apparatuses.

Upon deciding that the temporal change A and the voltage change B are not the same (NO at S23), the sequence information alteration unit 115 alters the duty ratio of the drive control signal corresponding to the power-up sequence information, so as to make the temporal change A closer to the voltage change B (S24).

For example, when the voltage rise rate represented by the temporal change A of the optional apparatus is lower than the voltage rise rate represented by the voltage change B, the sequence information alteration unit 115 alters the power-up sequence by increasing, by a predetermined value, the duty ratio of the High level in the drive control signal specified in the power-up sequence for the corresponding optional apparatus.

When the sequence information alteration unit 115 decides that the temporal change A and the voltage change B are the same (YES at S23), the sequence information alteration unit 115 keeps the current power-up sequence information unchanged.

Thus, at the next occasion of power-up the switch control unit 111 performs the power supply control for the optional apparatus on the basis of the updated power-up sequence altered as above. Therefore, in the control operation for starting the power supply to the corresponding optional apparatus, the temporal change A of the optional apparatus exhibits a higher voltage rise rate.

In contrast, when the voltage rise rate represented by the temporal change A of the optional apparatus is higher than the voltage rise rate represented by the voltage change B, the sequence information alteration unit 115 alters the power-up sequence by decreasing, by a predetermined value, the the duty ratio of the High level in the drive control signal specified in the power-up sequence for the corresponding optional apparatus.

Thus, at the next occasion of power-up the switch control unit 111 performs the power supply control for the optional apparatus on the basis of the updated power-up sequence altered as above. Therefore, in the control operation for starting the power supply to the corresponding optional apparatus, the temporal change A of the optional apparatus exhibits a lower voltage rise rate.

Through the aforementioned sequence alteration control, at the next occasion of the control operation for starting the power supply to the optional apparatus, the temporal change A of the corresponding optional apparatus becomes closer to the voltage change B stored in association with the power-up sequence information.

During the control operation for disconnecting the power supply to the optional apparatus also, the sequence information alteration unit 115 records a temporal change C of the voltage detected by the voltage detection unit 114

After the control operation for disconnecting the power supply to the optional apparatus is finished and the voltage drops to 0 V so that the power-down for each optional apparatus is completed, the sequence information alteration unit 115 decides whether the temporal change C of the voltage detected and recorded as above is the same as a voltage change D stored in advance in association with the power-down sequence information corresponding to the optional apparatus. This decision is made with respect to each of the optional apparatuses.

Upon deciding that the temporal change C and the voltage change B are not the same, the sequence information alteration unit 115 alters the duty ratio of the drive control signal corresponding to the power-down sequence information, so as to make the temporal change C closer to the voltage change D.

For example, when the voltage drop rate represented by the temporal change C of the optional apparatus is lower than the voltage drop rate represented by the voltage change D, the sequence information alteration unit 115 alters the power-up sequence by decreasing, by a predetermined value, the the duty ratio of the High level in the drive control signal specified in the power-down sequence for the corresponding optional apparatus.

Thus, at the next occasion of power-down, the switch control unit 111 performs the control operation for disconnecting the power supply to the optional apparatus on the basis of the updated power-down sequence altered as above. Therefore, in the control operation for disconnecting the power supply to the corresponding optional apparatus, the temporal change C of the optional apparatus exhibits a higher voltage drop rate than the previous time (voltage drops more quickly than in the previous time).

In contrast, when the voltage drop rate represented by the temporal change C of the optional apparatus is higher than the voltage drop rate represented by the voltage change D, the sequence information alteration unit 115 alters the power-down sequence by increasing, by a predetermined value, the duty ratio of the High level in the drive control signal specified in the power-down sequence for the corresponding optional apparatus.

Thus, at the next occasion of power-down, the switch control unit 111 performs the control operation for disconnecting the power supply to the optional apparatus on the basis of the updated power-down sequence altered as above. Therefore, in the control operation for disconnecting the power supply to the corresponding optional apparatus, the temporal change C of the optional apparatus exhibits a lower voltage drop rate than the previous time (voltage drops more slowly than in the previous time).

Through the aforementioned sequence alteration control, at the next occasion of the control operation for disconnecting the power supply to the optional apparatus, the temporal change C of the corresponding optional apparatus becomes closer to the voltage change D stored in association with the power-down sequence information.

The alteration of the power-up sequence and the power-down sequence described above allows, even though the power supply control sequence really needed actually becomes different from the past one owing to temporal degradation or a change in operation environment of the optional apparatus and the image forming apparatus 1, an optimum power supply control sequence for the actual power supply operation environment to be adopted in the power-up or power-down operation.

For example, when different optional apparatuses are respectively connected to a plurality of ports provided in a conventional image forming apparatus, the power supply control sequence to be performed at the time of turning the power on and off is different among the optional apparatuses depending on the load capacity, and hence it is not desirable to adopt the same power supply control sequence for all the optional apparatuses connected. In case that the same power supply control sequence is set in the power supply control circuit for all of the optional apparatuses, an optimum circuit configuration is unable to be obtained for all of the optional apparatuses, and therefore various drawbacks are incurred, for example that a longer time is required for initialization of the optional apparatus at the time of turning the power on, or the power source fluctuates at the time of turning the power off. With the configuration according to the foregoing embodiment, however, the power-up and power-down control optimum for each of the plurality of optional apparatuses can be executed, in the power supply control of the optional apparatuses.

The disclosure may be modified in various manners, without limitation to the configuration according to the foregoing embodiment. For example, although the image forming apparatus of the disclosure is exemplified by a multifunctional color printing apparatus in the embodiment, the disclosure is broadly applicable to various other image forming apparatuses and electronic apparatuses, such as a multifunctional monochrome printing apparatus, a printer, a copier, a facsimile machine, and so forth.

Further, the configurations and processes of the embodiment described with reference to FIG. 1 to FIG. 6 are merely exemplary, and not intended to limit the scope of the disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A power supply control circuit that controls power supply when supplying power from a power source to a plurality of loads, the power supply control circuit comprising:
   a plurality of ports to which the plurality of loads are respectively connected, and a plurality of power supply units that respectively turn on and off the power supply from the power source to the plurality of loads respectively connected to the plurality of ports;
   an identification information acquisition unit that acquires identification information proper to each of the loads, from the loads connected to the respective ports;
   a sequence information storage unit that stores therein power-up sequence information and power-down sequence information specified with respect to each of the plurality of loads; and a switch control unit that reads out, from the sequence information storage unit, the power-up sequence information and the power-down sequence information with respect to the load corresponding to the identification information acquired by the identification information acquisition unit, and causes the power supply unit to turn on and off the power supply to the load corresponding to the identification information, according to the power-up sequence information and the power-down sequence information read out, wherein the sequence information storage unit stores therein, as the power-up sequence information, a voltage rise rate during a period in which a voltage applied when the power supply from the power source to the load is started reaches a driving voltage appropriate for the load.

2. The power supply control circuit according to claim 1, further comprising:

a pulldown resistor that can be connected to and disconnected from a corresponding one of the ports;

a connection status detection unit that detects whether the load is connected to a corresponding one of the ports; and a resistor connection control unit that connects the pulldown resistor to the port with respect to which the connection status detection unit has decided that the load is not connected.

3. An image forming apparatus to which an optional apparatus can be retrofitted, comprising the power supply control circuit according to claim 1, wherein the power supply control circuit controls power supply to the optional apparatus, regarding the optional apparatus as the load.

4. A power supply control circuit that controls power supply when supplying power from a power source to a plurality of loads, the power supply control circuit comprising:

a plurality of ports to which the plurality of loads are respectively connected, and a plurality of power supply units that respectively turn on and off the power supply from the power source to the plurality of loads respectively connected to the plurality of ports;

an identification information acquisition unit that acquires identification information proper to each of the loads, from the loads connected to the respective ports;

a sequence information storage unit that stores therein power-up sequence information and power-down sequence information specified with respect to each of the plurality of loads; and a switch control unit that reads out, from the sequence information storage unit, the power-up sequence information and the power-down sequence information with respect to the load corresponding to the identification information acquired by the identification information acquisition unit, and causes the power supply unit to turn on and off the power supply to the load corresponding to the identification information, according to the power-up sequence information and the power-down sequence information read out, wherein the sequence information storage unit stores therein, as the power-down sequence information, a voltage drop rate during a period from a time that the power supply from the power source to the load is disconnected until a time that the voltage drops to 0 V.

5. A power supply control circuit that controls power supply when supplying power from a power source to a plurality of loads, the power supply control circuit comprising:

a plurality of ports to which the plurality of loads are respectively connected, and a plurality of power supply units that respectively turn on and off the power supply from the power source to the plurality of loads respectively connected to the plurality of ports;

an identification information acquisition unit that acquires identification information proper to each of the loads, from the loads connected to the respective ports;

a sequence information storage unit that stores therein power-up sequence information and power-down sequence information specified with respect to each of the plurality of loads; and a switch control unit that reads out, from the sequence information storage unit, the power-up sequence information and the power-down sequence information with respect to the load corresponding to the identification information acquired by the identification information acquisition unit, and causes the power supply unit to turn on and off the power supply to the load corresponding to the identification information, according to the power-up sequence information and the power-down sequence information read out, wherein the power supply control circuit further comprises:

a voltage detection unit that detects a voltage supplied to each of the loads connected to the respective ports from the power source through the power supply unit; and a sequence information alteration unit that alters, when a voltage change during power-up for the load detected by the voltage detection unit is different from a voltage change stored in association with the power-up sequence information specified for the load, a duty ratio of a drive control signal corresponding to the power-up sequence information so as to make the voltage change of the load detected by the voltage detection unit closer to the voltage change stored in association with the power-up sequence information.

* * * * *